Figures 1, 2:
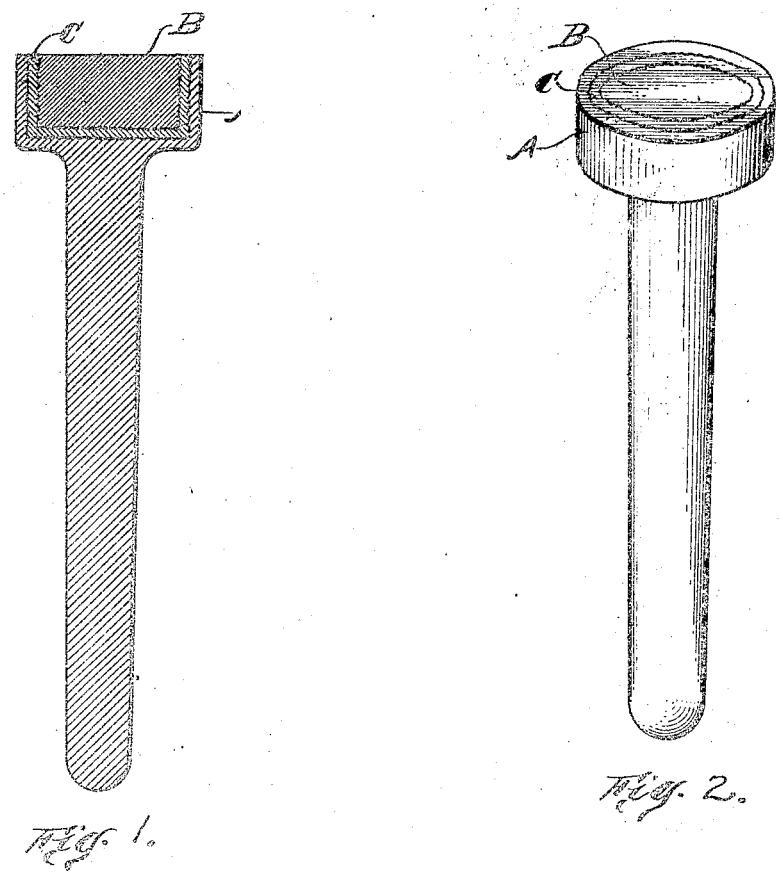

I. LADOFF.
ARC LIGHT ELECTRODE.
APPLICATION FILED FEB. 21, 1911.

1,062,168.

Patented May 20, 1913.

Witnesses:

Inventor:
Isador Ladoff.
Attorney.

UNITED STATES PATENT OFFICE.

ISADOR LADOFF, OF CLEVELAND, OHIO, ASSIGNOR, BY MESNE ASSIGNMENTS, OF THIRTY ONE-HUNDREDTHS TO WALTER D. EDMONDS, OF BOONVILLE, NEW YORK.

ARC-LIGHT ELECTRODE.

1,062,168. Specification of Letters Patent. Patented May 20, 1913.

Application filed February 21, 1911. Serial No. 609,899.

*To all whom it may concern:*

Be it known that I, ISADOR LADOFF, a citizen of the United States, and a resident of Cleveland, in the county of Cuyahoga and State of Ohio, have invented certain new and useful Improvements in Arc-Light Electrodes, of which the following is a specification.

My present invention relates to metallic arc light electrodes. Certain metals, particularly desirable as constituents of the anode in production of the now well understood metallic or flaming arcs, are particularly subject in use as such to oxidation resulting in deposits thereon of chemical compounds, oxids for example, which militate undesirably, if not prohibitively, against the utility for such purpose of said metals, such coatings for instance impairing required conductivity of the anode, etc. Heretofore various expedients have been resorted to to mitigate the aforesaid difficulties, as for example incasing the copper anode in an iron shell, for the purpose of thus excluding, as far as possible, the copper from contact with the atmosphere during arcing. Such expedients have, however, proved only partially successful, because such iron covering, however carefully applied, has served to protect the within copper for a comparatively short time only, the violent changes of temperature incident to arcing, as compared with disuse intermittently, operating to more or less separate the covering from the within copper, thus admitting oxygen, so that even plating of the copper by zinc or silver has proved insufficiently protective.

The object of my present invention is to produce an electrode anode consisting essentially of the given desired metal but also covered or coated with another metal less subject to electrical deterioration during arcing, the said two metals however being so united with each other as to effectually and permanently protect the within mass of desired metal from the aforesaid deteriorations for arc lighting purposes.

I accomplish this object by my present invention as follows, reference being had to the accompanying drawings, in which—

Figure 1 is a central longitudinal section of my improved anode, and Fig. 2 a perspective view thereof.

I first produce a container or cup A composed of a given metal, as for example iron, the dimensions of the said container being such as to impart suitable shape to the resulting product for use as an arc light electrode anode, the interior dimensions of such container being for example say half an inch in depth and about one inch in diameter, and the thickness of the container being about $\frac{1}{16}$th of an inch. I next heat said container to a high temperature, somewhat lower than the melting point of its constituent metal, for instance where iron is employed as above to about 1000 degrees C. I next fill said container while so heated with molten copper, after which the container and its contents are allowed to cool down to normal temperature, and the open or arcing end of the electrode resulting trimmed and smoothed in any convenient manner to impart thereto a commercially acceptable surface. The resulting product will be a unitary, solid, arc light electrode anode consisting, as shown by the drawings, of an outer zone or covering A composed of iron, an inner core B consisting of copper having an uncovered arcing surface, and intermediate said covering and core and uniting them, and thus their constituent metals; together firmly and imperviously a continuous zone C, more or less thick, composed of the alloy of some of the iron with some of the copper originally employed. The respective masses of the two metals thus employed are therefore firmly cemented together, by an intervening therewith mutually cohering zone of alloy thereof, the two metals having interpenetrated or diffused into each other to an extent sufficient to, as it were, weld them effectively to each other and with such completeness and permanence as to prohibit oxygen or other undesired elements from reaching, during arcing or at other times, the core of the protected metal so far as covered by the said zone of alloy and outer covering of more resistant metal. Moreover the said zone of alloy intermediate the two metals also imparts to the electrode desirable properties for arc lighting purposes unrealizable by the use of said two metals ununited by said zone. As will be seen, by reference to the drawings, the said covering is, on any line projected therethrough from, and at right angles to, the central longitudinal axis of the electrode, of uniform measurement smaller than that of said core, without which relative proportions I do not believe that my electrode could operate successfully in arc lighting.

It will be understood that I do not confine myself to the aforesaid combinations of iron and copper specifically, but that other metals and their alloys may, for the purpose of producing arc light electrodes, be treated by my said method to produce its aforesaid characteristic resulting product.

What I claim as new and desire to secure by Letters Patent is the following, viz:—

1. As a new article an arc light electrode comprising an inner core of metal having an uncovered arcing surface and elsewhere a covering of other metal, the said covering being, on any line projected therethrough from, and at right angles to, the central longitudinal axis of said electrode, of uniform measurement smaller than that of said core and the said two metals being cemented together by an intervening therewith mutually cohering zone of alloy thereof.

2. As a new article an arc light electrode comprising an inner core of copper having an uncovered arcing surface and elsewhere a covering of iron, the said covering being, on any line projected therethrough from, and at right angles to, the central longitudinal axis of said electrode, of uniform measurement smaller than that of said core and the said iron and copper being cemented together by an intervening therewith mutually cohering zone of alloy thereof.

ISADOR LADOFF.

Witnesses:
  J. H. WORBS,
  M. C. BIXBY.